United States Patent
Katayama

(10) Patent No.: US 7,620,054 B2
(45) Date of Patent: Nov. 17, 2009

(54) NETWORK SWITCHING DEVICE AND NETWORK SWITCHING METHOD

(75) Inventor: Taul Katayama, Kawasaki (JP)

(73) Assignee: Fujitsu Microelectronics Limited, Tokyo (JP)

( * ) Notice: Subject to any disclaimer, the term of this patent is extended or adjusted under 35 U.S.C. 154(b) by 488 days.

(21) Appl. No.: 11/047,774

(22) Filed: Feb. 2, 2005

(65) Prior Publication Data
US 2005/0129044 A1    Jun. 16, 2005

Related U.S. Application Data

(63) Continuation of application No. PCT/JP03/00388, filed on Jan. 17, 2003.

(51) Int. Cl.
*H04L 12/28* (2006.01)

(52) U.S. Cl. .................................. 370/395.42; 370/412

(58) Field of Classification Search ........................ None
See application file for complete search history.

(56) References Cited

U.S. PATENT DOCUMENTS

| | | | | |
|---|---|---|---|---|
| 5,892,762 | A * | 4/1999 | Okuda et al. ............ | 370/395.42 |
| 6,219,728 | B1 * | 4/2001 | Yin .............................. | 710/52 |
| 6,389,031 | B1 * | 5/2002 | Chao et al. ................... | 370/412 |
| 6,687,247 | B1 * | 2/2004 | Wilford et al. ............... | 370/392 |
| 6,870,854 | B1 * | 3/2005 | Aimoto et al. ............... | 370/412 |
| 6,907,001 | B1 * | 6/2005 | Nakayama et al. .......... | 370/230 |
| 6,920,109 | B2 * | 7/2005 | Yazaki et al. ............. | 370/230.1 |
| 6,934,250 | B1 * | 8/2005 | Kejriwal et al. ............. | 370/229 |
| 6,973,032 | B1 * | 12/2005 | Casley et al. ................ | 370/230 |
| 7,016,366 | B2 * | 3/2006 | Kawarai et al. ............. | 370/413 |
| 7,058,751 | B2 * | 6/2006 | Kawarai et al. ............. | 710/317 |
| 7,110,415 | B1 * | 9/2006 | Walsh et al. ................. | 370/414 |
| 7,116,633 | B2 * | 10/2006 | Honda ......................... | 370/218 |
| 7,120,159 | B2 * | 10/2006 | Kumazawa et al. ..... | 370/395.42 |
| 7,130,903 | B2 * | 10/2006 | Masuda et al. .............. | 709/225 |

(Continued)

FOREIGN PATENT DOCUMENTS

JP     3-220838     9/1991

(Continued)

OTHER PUBLICATIONS

Patent Abstracts of Japan, Publication No. 05-091142, Published Apr. 9, 1993.

(Continued)

*Primary Examiner*—Phirin Sam
(74) *Attorney, Agent, or Firm*—Staas & Halsey LLP

(57) ABSTRACT

A network switching device is provided for enabling priority control of packets, enhancing the using efficiency of a buffer for storing a received packet, and reducing the costs of components. The received packet is stored in the corresponding buffer with information of the packet under the control of a buffer controller. Further, a priority determining circuit is also provided for determining a priority class and a destination of the received packet. The buffer controller creates a transmit queue to which the packets of priority classes are to be registered in each buffer. When writing the received packet in the buffer, the buffer controller is served to reserve the received packet for transmission next to the last registered one of the packets of the same priority class registered in the corresponding transmit queue based on the determination of the priority determining circuit.

7 Claims, 11 Drawing Sheets

U.S. PATENT DOCUMENTS

| | | | |
|---|---|---|---|
| 7,190,674 B2 * | 3/2007 | Kobayakawa et al. | 370/235 |
| 7,287,061 B2 * | 10/2007 | Tsubota | 709/207 |
| 2002/0054602 A1 | 5/2002 | Takahashi et al. | |
| 2002/0141403 A1 | 10/2002 | Akahane et al. | |
| 2003/0202525 A1 * | 10/2003 | Nagatomo | 370/411 |
| 2004/0114516 A1 * | 6/2004 | Iwata et al. | 370/230.1 |
| 2004/0151197 A1 * | 8/2004 | Hui | 370/412 |

FOREIGN PATENT DOCUMENTS

| | | |
|---|---|---|
| JP | 11-346246 | 12/1999 |
| JP | 2000-341295 | 12/2000 |
| JP | 2002-354025 | 12/2002 |

OTHER PUBLICATIONS

Patent Abstracts of Japan, Publication No. 06-164641, Published Jun. 10, 1994.

Patent Abstracts of Japan, Publication No. 10-098475, Published Apr. 14, 1998.

Patent Abstracts of Japan, Publication No. 11-122257, Published Apr. 30, 1999.

Patent Abstracts of Japan, Publication No. 2000-151633, Published May 30, 2000.

Patent Abstracts of Japan, Publication No. 2000-299701, Published Oct. 24, 2000.

Patent Abstracts of Japan, Publication No. 2000-341295, Published Dec. 8, 2000.

Patent Abstracts of Japan, Publication No. 2000-349786, Published Dec. 15, 2000.

Patent Abstracts of Japan, Publication No. 2002-152247, Published May 24, 2002.

International Search Report dated May 13, 2003 in corresponding Application PCT/JP2003/000388.

Japanese Office Action issued on Aug. 29, 2006 in corresponding Japanese Application No. 2004-567109.

Patent Abstracts of Japan, Publication No. 04-096546, Published Mar. 27, 1992.

Patent Abstracts of Japan, Publication No. 2002-300193, Published Oct. 11, 2002.

Japanese Patent Office Action issued Jan. 9, 2007 in corresponding Japanese Appln. No. 2004-567109.

* cited by examiner

NETWORK SWITCHING DEVICE AND NETWORK SWITCHING METHOD

This application is a continuing application, filed under 35 U.S.C. §111(a), of International Application PCT/JP2003/000388 filed Jan. 17, 2003.

BACKGROUND OF THE INVENTION

1. Field of the Invention

The present invention relates to a network switching device and a network switching method which are arranged to transfer packets among a plurality of networks, and more particularly to the store & forward system network switching device and network switching method which are arranged to allow transfer control to be executed depending on the priority of packets.

2. Description of the Related Art

A network switching device has been often used for connecting lots of networks as in the Internet or the like. In particular, the frequently used switching system is a store & forward system which is arranged to temporarily store received packets in an internal buffer and then transfer those packets to a destination port. In the store & forward system network switching device, it is general that the packets to be transmitted are controlled as a listed queue for each destination port, the listed queues being linked with each other by a pointer. For example, the packet switch for controlling the listed queue created in a buffer memory has been conventionally proposed as follows.

This packet switch operates to write a variable-length packet received from each input line in a common buffer memory at a fixed-length data block unit. When writing the packet, a buffer controller creates an input queue for each input line and then links the linked address list of each input queue with an output queue matched to a transfer destination output line after registering the last data block of the variable-length packet in the input queue. Each input queue is created by storing the write address of the next fixed-length data block in the next address memory. Further, each output queue is composed of a next read address for indicating a data block to be read out and an address table for storing the last read address for indicating the last data block. The input queue control module of the buffer controller operates to transfer the write address of the head data block of each variable-length packet and the write address of the last data block to the next read address and the last read address of the address table matched to each transfer destination output line. This operation completes the input queue link with the output queue. Further, in a case that the last read address of the preceding variable-length packet has been already registered in the output queue, the operation is executed to extract the write address of the head data block of the following variable-length packet from the next address memory and then link the extracted address with the last read address. The foregoing control makes it possible to enhance the using efficiency of the buffer memory as well as speed up the switching operation. For example, refer to Japanese Unexamined Patent Publication No. 2002-152247 (paragraph numbers [0025] to [0040], FIG. 3).

In the meantime, the information to be communicated through the network may be roughly divided into the information the quality of which is required to be kept constant or more and the information the quality of which is permitted to be degraded. For example, therefore, it is considered the case that the multileveled priority classes are defined so that those priority classes may be assigned to the packets to be communicated according to the attribute (transmit source address or the like) of each packet. In this case, the network switching device enables to transfer the packets in sequence of their assigned priority classes, which makes it possible to transfer a packet of a higher priority class more reliably.

The store & forward system network switching device ordinarily operates to determine the destination of the received packet, link the received packet with the packet queue created for each destination (each output port), read the packets from these queues, and then send out the read packets. In a case that the received packets are assigned their respective priorities and the priority control for the received packets is executed, the operation is executed to create the same number of queues as the priority classes for each output port, link the received packets distributed for each priority class with the queue of the corresponding priority class, and send out the packets in higher sequence of the priority classes assigned to their linked queues. This operation realizes the priority control.

As representative information of higher priority, for example, voice data or time-varying image data may be referred. For supporting the communications of information to be transferred on real time as much as possible, it is necessary to shorten the delay time caused by the relay operation involved in the network switching device as much as possible. However, even the network switching device-provided with the priority control function may discard even the packets of the high priorities assigned thereto, for example, if congestion of traffics for the same priority class of the same output port takes place.

Under those circumstances, the packet switch which may reduce the relay-related delay time of the packets of higher priorities has been conventionally proposed as follows. This packet switch is arranged to convert the variable-length packet received from the input line into the fixed-length cell through the corresponding input line interface, cause its switch module to execute the cell-based switching, convert the output cell from the switch module into the original variable-length packet through the corresponding output line interface, and then send out the converted packet onto the output line. Each input line interface is characterized to have a control module for queuing the fixed-length cells converted from the received variable-length packets according to the priorities of each output line and selectively outputting the cells accumulated in each queue according to their priorities.

This packet switch may be often inputted with a plurality of packets destined for a specific output port from a plurality of input lines in a time-overlapped manner. If the accumulation of the cells destined for the specific output port exceeds a predetermined threshold value, a notice for congestion is reported to each input line interface. In response to the notice, the input line interface, which is sending out the cells destined for the specific output port, suppresses the transmission of the cells selectively in lower sequence of their priorities. This operation allows too much increase of the congestion to be avoided and thereby makes it possible to transfer the packets of higher priorities to the output line without having to greatly delay the transfer. For example, refer to Japanese Unexamined Patent Publication No. 2000-151633 (paragraph numbers [0012]) to [0018], FIG. 1).

In the foregoing store & forward system network switching device, ordinarily, the packet queue formed for each destination is stored in the buffer of a finite size sectioned physically or logically. Moreover, the network switching device provided with the priority control function often includes packet queues created respectively for priority classes. In this type of network switching device, if traffics destined for a specific priority class are concentrated in a certain output port, congestion may take place in the queue where the traffics are concentrated even though some capacity is left in the queue of another priority class for the same output port. In order to avoid this congestion, for example, it is necessary to secure a sufficient amount of buffer for the queue of each priority class. In this case, however, as disadvantages, the using efficiency of the memory is made lower and thereby the memory parts are made more costly with increase of the memory capacity.

In the packet switch disclosed in the foregoing Official Gazette of Japanese Unexamined Patent Publication No. 2000-151633, the queue of each priority class may be created in the buffer memory located in the switch module and the output buffer memory located in the output line interface. Each buffer memory takes a common buffer structure in which the queue of a priority class uses an empty storage area commonly with the queue of another priority class, for the purpose of making an effective use of the memory capacity. For this purpose, however, both of the switch module and the output line interface require the buffer control as managing the linked lists prepared respectively for the output lines and the priority classes, which results in disadvantageously making the process more complicated and enhancing the cost. Further, this packet switch is arranged on the assumption that the received packet is converted into the fixed-length cell before the packet is treated. This also, as before, disadvantageously makes the process more complicated and enhances the cost.

SUMMARY OF THE INVENTION

In view of the foregoing, it is an object of the present invention to provide a network switching device which is arranged to make the priority control for packets possible, enhance the using efficiency of the buffer for storing the received packets, and reduce the cost of parts.

To accomplish the above object, the present invention provides a network switching device for transferring packets among a plurality of networks. This network switching device includes a plurality of buffers provided with the destination networks to which the packets are to be transferred, a priority determining circuit for determining a priority class of each packet received in the device itself, and a buffer controller for creating transmit queues in which the packets of their priority classes are to be registered, writing the received packets in the corresponding buffer for the destination, and registering the received packet to be reserved for transmission next to the last registered one of the packets of the same priority class registered in the corresponding transmit queue.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Hereafter, the embodiments of the present invention will be described with reference to the appended drawings.

Figure 1:
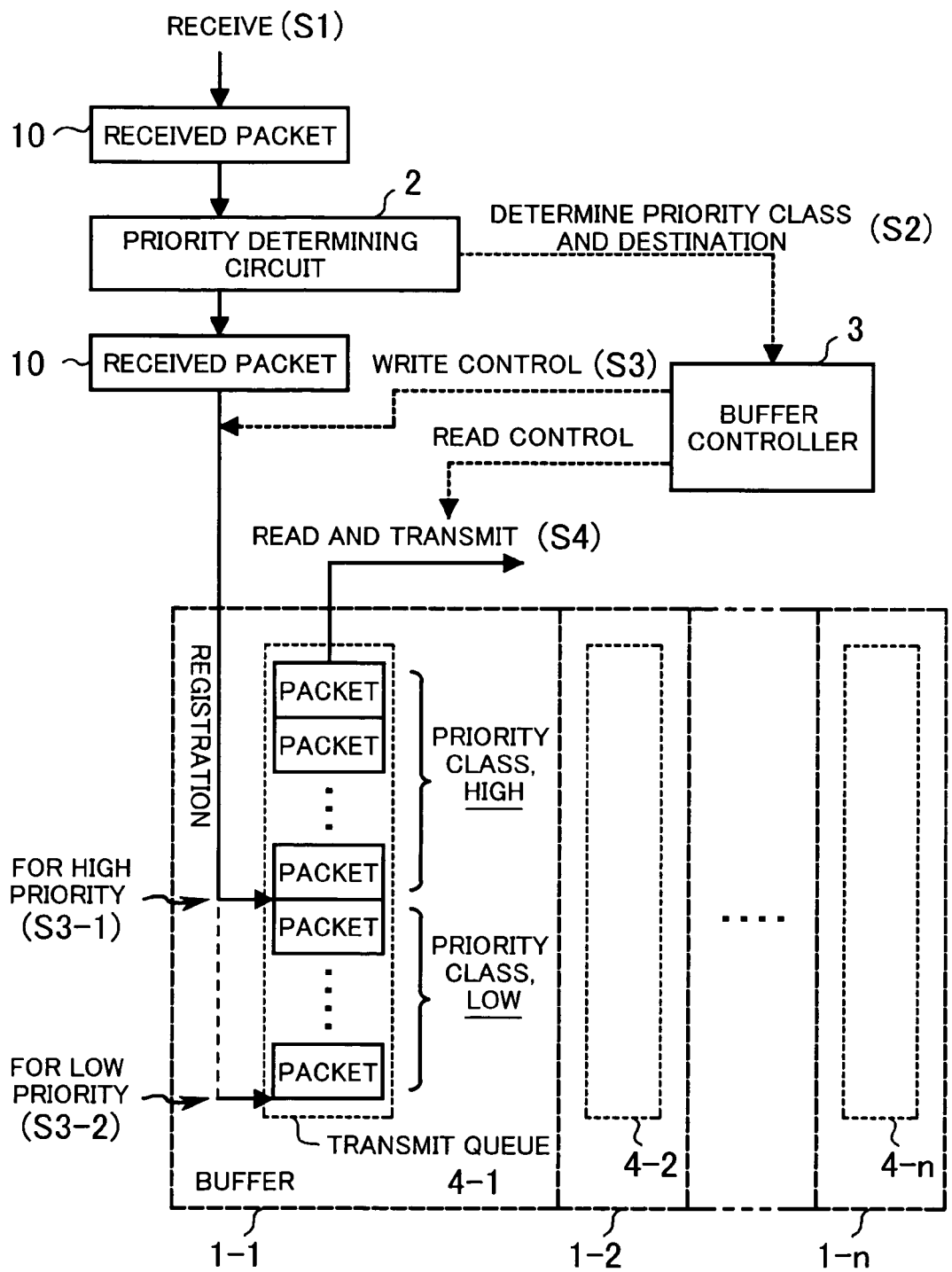
FIG. 1 is a concept diagram for explaining the principle of the present invention.

FIG. 1 is a concept diagram for explaining the principle of the present invention.

The network switching device of the present invention is connected with a plurality of networks so that packets may be transferred among those networks. As shown in FIG. 1, this network switching device includes buffers 1-1 to 1-n (n is an integer of 1 or more) located respectively for destination networks, a priority determining circuit 2, and a buffer controller 3.

Each buffer 1-1 to 1-n is a storage unit that stores the packets(s) 10 received through the network (referred simply to as the received packet(s)) according to the destination assigned to each packet. Each buffer is composed of a semiconductor memory, for example. In addition, those buffer areas are not inevitably required to be physically separated from one another. Those buffer areas may be formed on one shared buffer in the logically separated manner.

The priority determining circuit 2 determines the priority class assigned to the received packet 10 and notifies the buffer controller 3 of the determined result. The buffer controller 3 controls the operation of writing and reading the received packets 10 in and out of the buffers 1-1 to 1-n. The buffer controller 3 creates the transmit queues 4-1 to 4-n for the buffers 1-1 to 1-n respectively located for the destination networks so that the received packets 10 may be stored in the buffer for their destination and registered in the corresponding transmit queues with their destinations. Herein, each of the transmit queues 4-1 to 4-n enables to register the packets of two or more priority classes. The buffer controller 3 determines the registration location of those transmit queues based on the determined result of the priority determining circuit 2.

Concretely, the received packets 10 are registered in the transmit queue so that those received packets 10 may be reserved for transmission next to the last registered one of the packets of the same priority class as the received packets 10, those packets having been registered in the corresponding transmit queue with the destination.

Hereafter, the switching operation to be executed by this network switching device will be described in sequence. This description will be expanded on the assumption that the network switching device receives the packets to be transferred to the corresponding network with the buffer 1-1.

When the packet is received from the connected network (step S1), the priority determining circuit 2 determines the priority class assigned to the received packet 10 (step S2). This determination is executed by referring to the header information of the received packet 10. The determined result is notified to the buffer controller 3. In response to the notice of the destination of the received packet 10 from a header analyzer (not shown), for example, the buffer controller 3 controls its operation so that the received packet 10 may be written in the corresponding buffer 1-1 with the noticed destination (step S3). In the buffer 1-1, the transmit queue 4-1 is created under the control of the buffer controller 3. In the transmit queue 4-1, the packets are registered in sequence of the scheduled transmission. Herein, if one or more packet of the same priority class with that of the received packet 10 have been already registered in the transmit queue 4-1, the received packet 10 is registered so that the packet 10 may be reserved for transmission next to the last registered one of those packets in the transmit queue 4-1.

In FIG. 1, as an example, two priority classes, that is, a high priority and a low priority are specified. In the transmit queue 4-1 located in the buffer 1-1, the packets of both of the priority classes have been already registered. Herein, if the received packet 10 is determined as the high priority class, the received packet 10 is inserted into the tail of the packets of the high priority class in the transmit queue 4-1 (step S3-1). Further, if the received packet 10 is determined as the low priority class, the received packet 10 is registered at the tail of the packets of the low priority class (step S3-2). In the step S3-1, if no empty area is left in the buffer 1-1 when the received packet 10 is to be registered, the operation is executed to discard the last registered packet of the lowest priority class of the packets registered in the transmit queue 4-1 and then add the received packet 10. Moreover, in the step S3-2, likewise, if no empty area is left in the buffer 1-1, the received packet 10 itself is discarded.

The foregoing write control for the buffer 1-1 allows the packet of the high priority class to be constantly reserved for transmission in precedence of the packet of the lower priority class. Under the control of the buffer controller 3, the packets are read out of the transmit queue 4-1 from the head in sequence and then are transmitted to the corresponding network (step S4).

The foregoing operation makes it possible to register the packets so that in the transmit queue 4-1 those packets of higher priority classes and received earlier may be transmitted earlier under the write control for the buffer 1-1 executed by the buffer controller 3. At a time, in the case of securing an empty area in the buffer 1-1 without specifying any buffer capacity assigned for each priority class, the received packet 10 is stored independently of its priority class. Hence, if any congestion takes place because of the concentration of the packets in this transmit queue 4-1, the packets of a higher priority class are transmitted more reliably and the using efficiency of the buffer 1-1 is enhanced. These result in being able to suppress the capacity of the buffer 1-1 and thereby reducing the cost of memory parts.

In order for the buffer controller 3 to efficiently execute the write and read control of the buffers 1-1 to 1-n, it is just necessary to manage the packets stored in the buffers 1-1 to 1-n as the linked lists created based on the write locations in each of the buffers 1-1 to 1-n. For example, a pointer stack for holding pointers for pointing the write locations of each buffer 1-1 to 1-n is provided so that the buffer controller 3 may pop up the pointer from this pointer stack for obtaining the pointer when writing the received packet 10. The link between the packets registered in the transmit queue 4-1 to 4-n is managed by using the linked lists with the pointers each for pointing to each packet.

In turn, the embodiments of the present invention will be described in more detail.

First Embodiment

Figure 2:
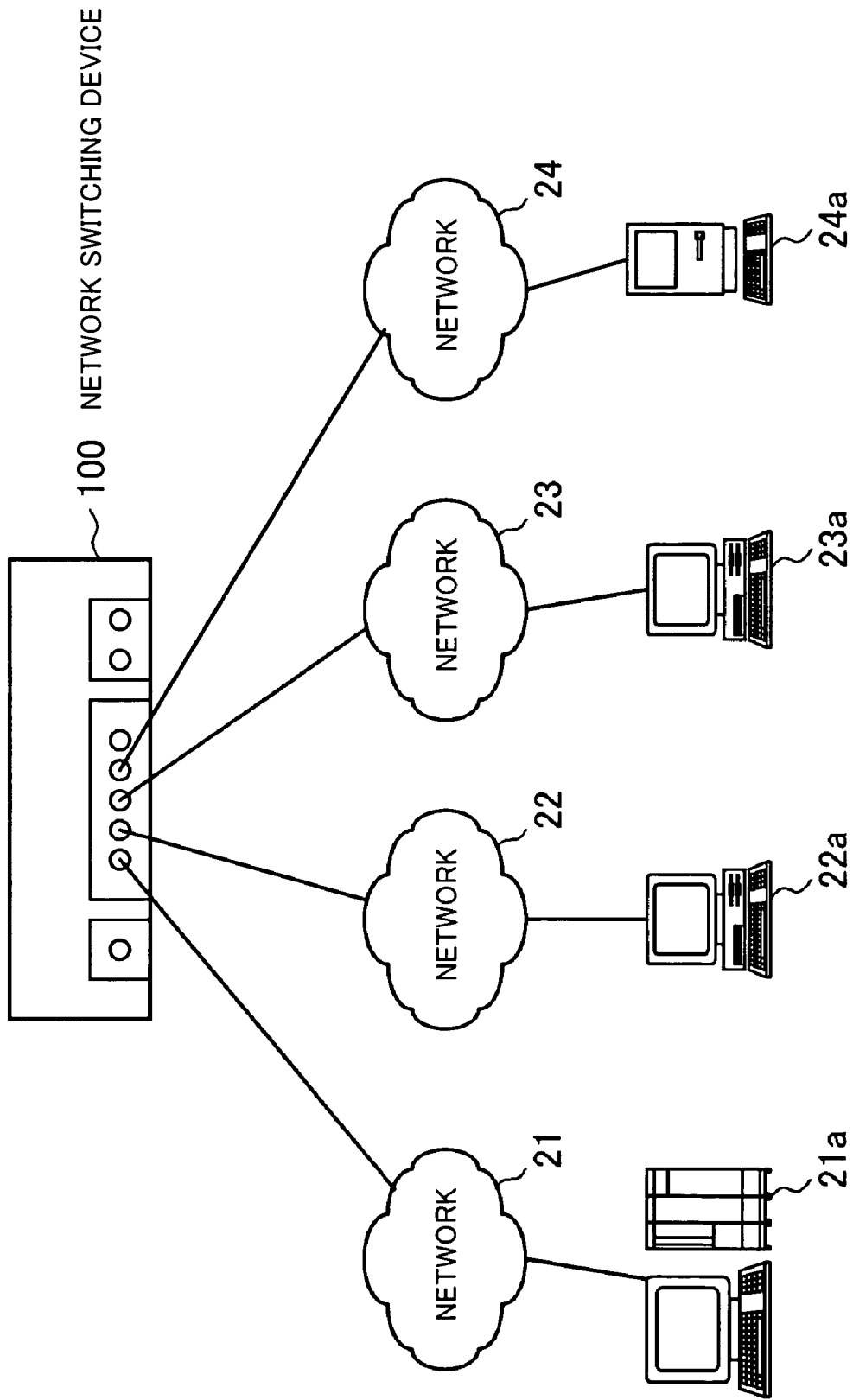
FIG. 2 illustrates the exemplary connection of a network switching device according to a first embodiment of the present invention.

FIG. 2 illustrates an exemplary connection of the networks through the switching device according to the first embodiment of the present invention. As shown, the network switching device 100 includes a plurality of communication ports, which are connected with networks 21 to 24, respectively. The networks 21 to 24 are connected with terminals 21a, 22a, 23a and 24a, respectively.

The network switching device 100 is served to transfer packets among the networks 21 to 24 connected therewith. For example, the packets to be transmitted from the terminal 21a to the terminal 22a are inputted into the network switching device 100 through the network 21 and then transferred into the network 22 through the effect of the network switching device 100. Then, the transferred packets are received in the terminal 22a through the network 22.

Figure 3:
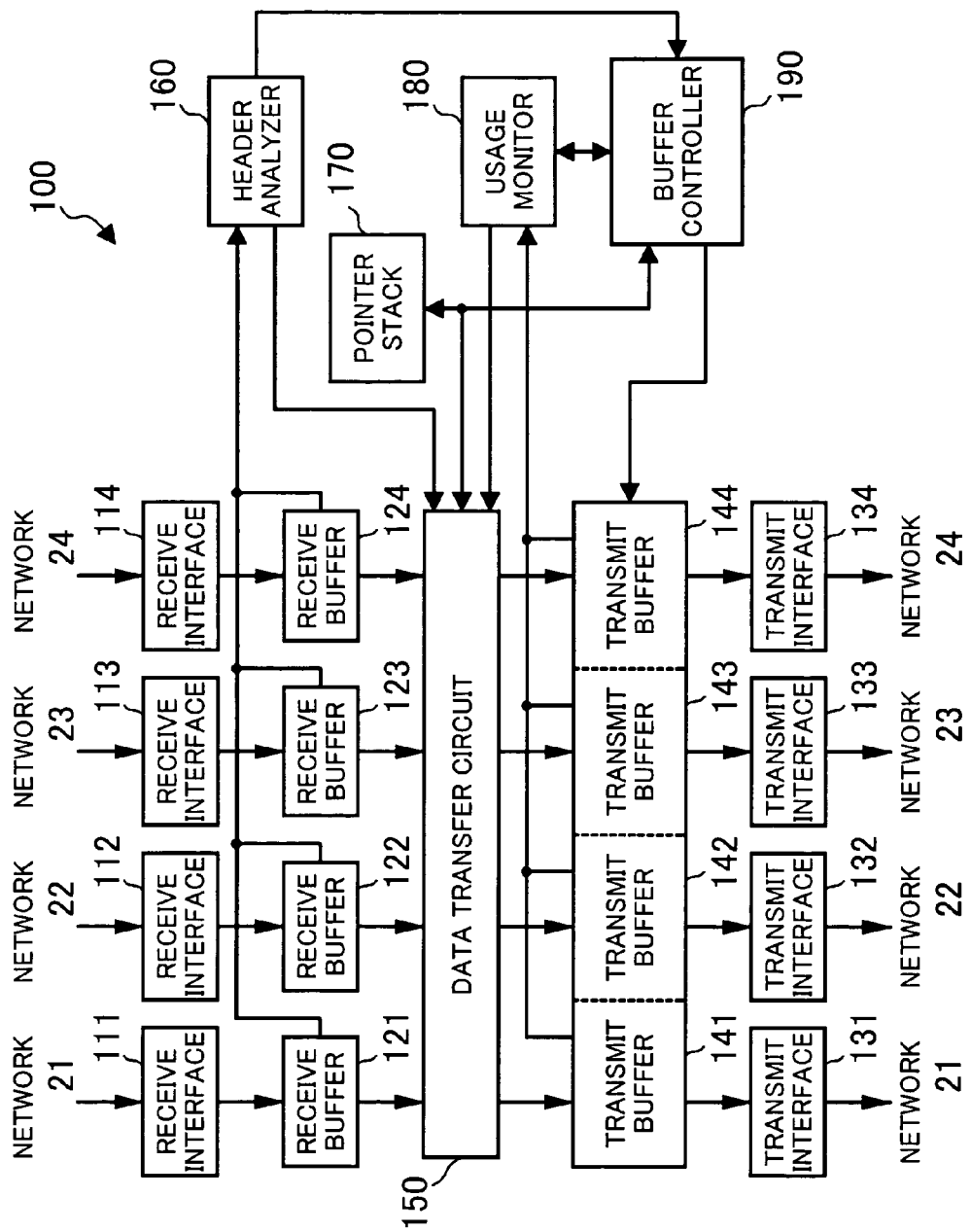
FIG. 3 is a block diagram showing an internal configuration of the network switching device according to the first embodiment of the present invention.

FIG. 3 is a block diagram showing an internal arrangement of the network switching device 100. As shown, the network switching device 100 includes receive interfaces 111 to 114, receive buffers 121 to 124, transmit interfaces 131 to 134, transmit buffers 141 to 144, a data transfer circuit 150, a header analyzer 160, a pointer stack 170, a usage monitor 180, and a buffer controller 190.

The receive interfaces 111 to 114 are communication interfaces which receive data from the external networks and are connected with the external networks 21 to 24, respectively. The receive interfaces 111 to 114 are served to supply the packets received through the networks 21 to 24 to the receive buffers 121 to 124, respectively. The receive buffers 121 to 124 are buffer memories which temporarily store the packets supplied from the receive interfaces 111 to 114, respectively. The receive buffers 121 to 124 are served to output the header information of the packets stored therein to the header analyzer 160 and request the data transfer circuit 150 to output the packets. Then, in accordance with the response given from the data transfer circuit 150, the receive buffers 121 to 124 output their stored packets to the data transfer circuit 150.

On the other hand, the transmit interfaces 131 to 134 are communication interfaces which transmit data to the external networks, respectively. The transmit interfaces 131 to 134 are thus connected with the networks 21 to 24, respectively. Those interfaces 131 to 134 are served to transmit the packets supplied from the transmit buffers 141 to 144 to the networks 21 to 24, respectively.

The transmit buffers 141 to 144 are buffer memories which temporarily store the packets supplied from the data transfer circuit 150. The transmit buffers 141 to 144 write the supplied packets at the addresses specified by the data transfer circuit 150. Then, in accordance with the transmit request given from the corresponding transmit interfaces 131 to 134, the transmit buffers 141 to 144 are served to read the written packets from the addresses specified by the buffer controller 190 and then output the read packets to the transmit interfaces 131 to 134, respectively. Each time the packet is written or read, the transmit buffers 141 to 144 notify the usage monitor 180 of the write or the read operation. In response to the notice, the usage monitor 180 enables to monitor the usage of each of the transmit buffers 141 to 144. Further, in each of the transmit buffers 141 to 144, one transmit queue is created under the control of the buffer controller 190. Then, an attached cell area is formed for each of the packets written in the transmit queue so that a pointer is written in the attached cell area under the control of the buffer controller 190, the pointer for pointing the write location of the preceding packet and the following one of the transmit queue where the concerned packet is registered. This operation makes it possible to manage the link of the packets registered in each transmit queue.

The data transfer circuit 150 is inputted with the packets from the receive buffers 121 to 124 and then transfer the packets to their destined transmit buffers. In response to the output request from each of the receive buffers 121 to 124, the data transfer circuit 150 obtains the information for indicating the destination of the packet from the header analyzer 160. Further, based on the information sent from the usage monitor 180, the data transfer circuit 150 determines if the write of the packet to its destined transmit buffer is made possible. If possible, the data transfer circuit 150 obtains the pointer from the pointer stack 170, specifies the write address derived from the pointer, and then transfer the packet to the destined transmit buffer.

The header analyzer 160 obtains the header information of the packets stored in the receive buffers 121 to 124 and notifies the data transfer circuit 150 and the buffer controller 190 of the transmit port specified as the destination of the packet. Further, the header analyzer 160 determines the priority class of the packet based on the obtained header information and notifies the buffer controller 190 of the priority class of the packet. Moreover, the header analyzer 160 provides the correspondence table between the transmit ports specified as the destinations and the priority classes and then determines the priority class from the destination indicated in the header information by referring to this correspondence table.

The pointer stack 170 stores pointers, each of which points at a vacant area at which a packet may be stored in the transmit buffers 141 to 144. In response to the request given from the data transfer circuit 150, the pointer stack 170 pops up the requested pointer and then outputs the pointer to the data transfer circuit 150 and the buffer controller 190. Further, in a case that the area in the transmit buffers 141 to 144, pointed by the pointer, is made empty as a result of reading or discarding the packet from that area, the pointer is supplied by the buffer controller 190 and then pushed back to the pointer stack 170. Hence, any pointer included in the pointer stack 170 enables to point an empty area in the transmit buffers 141 to 144 without fail.

The usage monitor 180 notifies the data transfer circuit 150 and the buffer controller 190 of the information for indicating if an empty area is left in each of the transmit buffers 141 to 144. The usage monitor 180 receives the notice about the write or read operation of the packet from each transmit buffer 141 to 144. Also, the usage monitor 180 is given by the buffer controller 190 the notice that a packet stored in the transmit buffers 141 to 144 is discarded and the corresponding area is made empty. Then, based on these notices, the usage monitor 180 can keep track of the buffer usage of each of the transmit buffers 141 to 144 and determine whether the transmit buffer has any empty area or not by checking if the count value reaches a predetermined value. This usage monitor 180 updates the information for indicating if an empty area is left in each of the transmit buffers 141 to 144 to the data transfer circuit 150 and the buffer controller 190. This update is executed, for example, in response to the request from each notified destination.

The buffer controller 190 controls the write and the read operations of the packets in the transmit buffers 141 to 144. Further, the buffer controller 190 creates one transmit queue in each of the transmit buffers 141 to 144 and then registers in the transmit queue the written packet according to its priority class. The buffer capacity allocated to each transmit queue is finite. The transmit queue is managed through the use of the bidirectional linked list structure that links the registered packet with its preceding and following packets.

Hence, when writing the packet in the transmit buffers 141 to 144, the buffer controller 190 obtains from the pointer stack 170 a pointer that points the write address of this packet. Then, the buffer controller 190 provides a corresponding attached cell area with each packet in the transmit buffers 141 to 144 and writes in to such attached cell area the pointer that points to the preceding and the following packets of the concerned packet in the transmit queue.

Moreover, for each transmit queue, the packet belonging to a higher priority class is reserved for transmission constantly in an upper rank. The packets belonging to the same priority class are reserved for transmission in receiving sequence of those packets. For managing the registration of the packets according to their priority classes, as will be discussed below, the buffer controller 190 is equipped with a group of registers for holding the pointers, each of which points the head packet and the tail packet of the registered packets in each priority class. Each time the packet is written or read out, the buffer controller 190 updates the pointers held in the group of registers.

In this embodiment, those transmit buffers 141 to 144 are secured in one shared memory in a manner that the buffer areas are logically separated from each other when they are used. Hence, the pointer stack 170 holds the pointers for the write addresses in the overall area of the shared memory in a unified manner, which makes it possible to efficiently use the shared memory. However, the capacity of the buffer area for each transmit port (that is, the capacity used as each of the transmit buffers 141 to 144) is determined to be constant, and each capacity is monitored by the usage monitor 180.

The foregoing network switching device 100 executes the switching operation that enables to determine the transfer sequence of the packets according to their priority classes and whether or not the packet is to be discarded. For example, when receiving the packet to be transferred from the network 21 to the network 22, the packet received in the receive interface 111 is temporarily stored in the receive buffer 121. The header information of this packet is notified to the header analyzer 160. Then, the header analyzer 160 determines the priority class and destination of the packet based on information from the packet and then notifies the buffer controller 190 of its priority class and its destination.

When the data transfer circuit 150 receives the packet from the receive buffer 121, the data transfer circuit 150 starts the transfer operation of the packet to the corresponding transmit buffer 142 with the destination notified by the header analyzer 160. When the data transfer circuit 150 determines that the write of the packet in the transmit buffer 142 is enabled on the basis of the information given from the usage monitor 180, the data transfer circuit 150 pops up the pointer from the pointer stack 170 for obtaining the pointer and then transfers the packet to the address pointed by the obtained pointer.

The buffer controller 190 determines if the packet of the notified priority classes may be registered in the transmit queue in the corresponding transmit buffer 142 with the notified destination. If it is determined that an empty area is left in the transmit queue based on the notified usage given from the usage monitor 180, the packet may be registered in the transmit queue, while if no empty area is left, it is determined if the notified packet is to be registered according to it's priority class notified by the header analyzer 160.

If it is the latter case (i.e. if a packet of a lower priority class than that of the packet to be registered has been already registered in the transmit queue), the buffer controller 190 determines that the new packet may be registered. In this case, the buffer controller 190 performs the operation of discarding the packet with lower priority registered in the tail of the transmit queue and notifies the usage monitor 180 of the discard of the packet. This causes the usage monitor 180 to notify the data transfer circuit 150 of the occurrence of an empty area in the transmit buffer 142. In response, the data transfer circuit 150 transfers the packet to the transmit buffer 142.

On the other hand, if the packet of the same or lower priority class than that of the packet to be registered has not been registered in the transmit queue located in the transmit buffer 142, the buffer controller 190 determines that the new packet cannot be registered. In this case, since the area inside of the transmit buffer 142 is not released, the usage monitor 180 continues to notify the data transfer circuit 150 of the fact that the write of the packet is disabled. This causes the data transfer circuit 150 to determine the transfer of the packet is not possible and thereby discard the packet received from the receive buffer 121.

As to the packets written in the transmit buffer 142, the registration of the packets to the transmit queue are managed as the linked list under the control of the buffer controller 190. Those packets are read out in the registering sequence of the transmit queue and then are sent out from the transmit interface 132 to the network 22.

Figure 4:
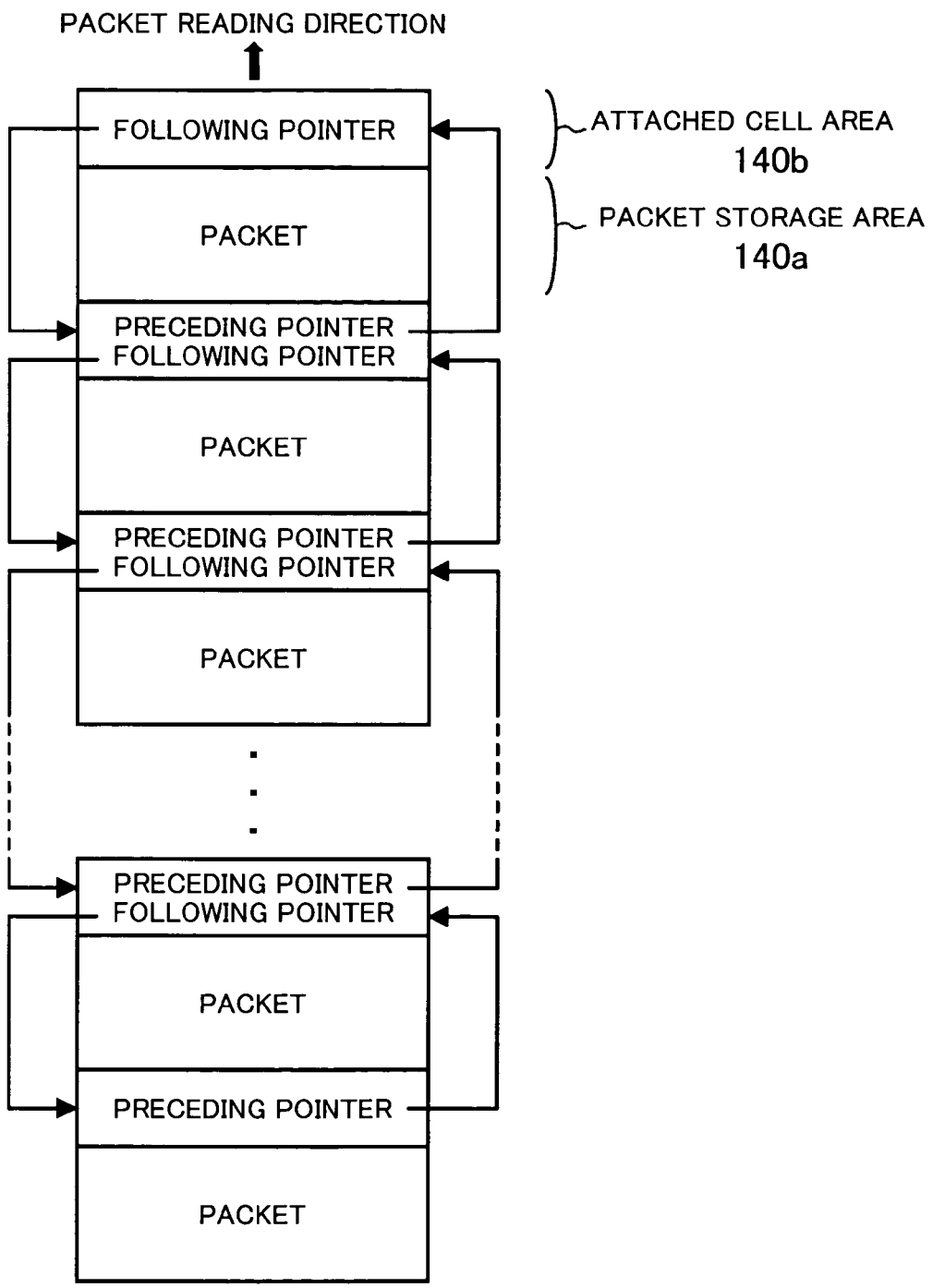
FIG. 4 is a model view showing a structure of data stored in a transmit buffer included in the network switching device according to the first embodiment of the present invention.

FIG. 4 is a model view showing the structure of the data stored in the transmit buffer.

In FIG. 4, the packets stored in the transmit buffers 141 to 144 are shown in the registering sequence of the transmit queue created in each buffer. The continuous locations of the packets linked in the transmit queue is shown in FIG. 4. In actual, however, the physical write locations of the packets in the transmit buffers 141 to 144 do not always follow the shown locations.

As described above, in each of the transmit buffers 141 to 144, the packet storage area 140*a* is provided for storing each packet and the attached cell area 140*b* is created for each packet. As shown in FIG. 4, the attached cell area 140*b* stores a pointer that points the packet located immediately before the concerned packet in the transmit queue (which pointer will be referred to as a preceding pointer) and the other pointer that points the packet immediately after the concerned packet therein (which pointer will be referred to as a following pointer).

Each pointer is written in the attached cell area 140*b* by the buffer controller 190. The preceding pointer is written when the received packet is transferred to any one of the transmit buffers 141 to 144, while the following pointer is written when the following packet is registered in the transmit queue. The use of these pointers makes it possible to manage the packets in the transmit queue as the bidirectional linked list structure wherein each packet is linked with the preceding and the following packets, that is, the packets located in the two directions. For example, when the packet is read out, by referring to the following pointer of the concerned pointer in the attached cell area 140*b*, it is possible to grasp the write location of the packet to be transmitted next. Further, in a case that no empty area is left in the transmit buffer and any packet in the transmit queue is required to be discarded according to the determined priority class, the packet located at the tail of the transmit queue is discarded. At this time, by referring to the preceding pointer of the attached cell area 140*b* for the packet to be discarded, it is possible to grasp the write location of the packet to be located at the tail after the previous packet at the tail is discarded.

In turn, the control of the buffer controller 190 through the use of each pointer stored in the attached cell area 140*b* will be described in more detail. In the following description, it is assumed that the three priority classes of "high priority," "middle priority" and "low priority" are treated. The priority classes are higher in the describing sequence.

Figure 5:
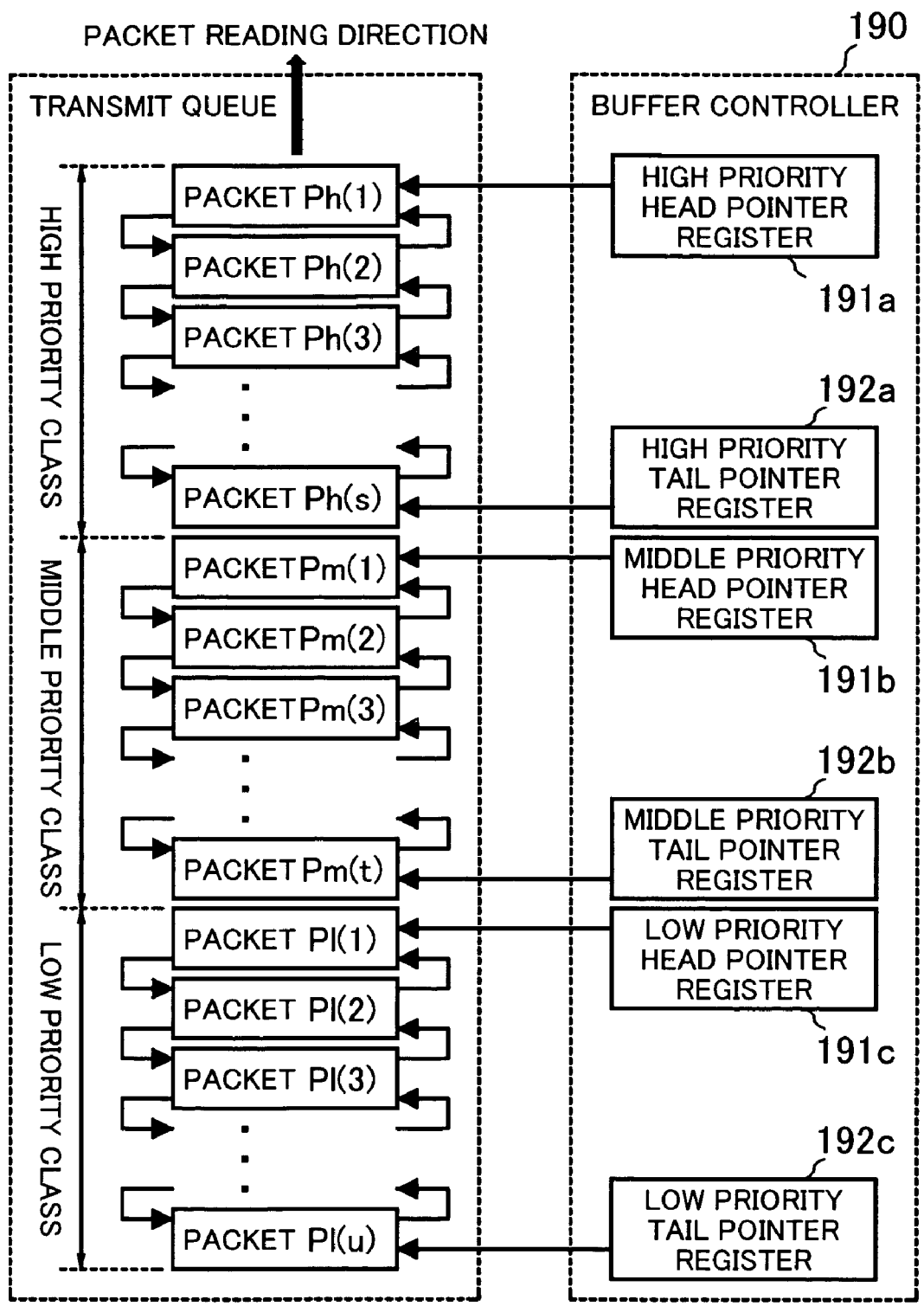
FIG. 5 illustrates relation between a group of registers provided in a buffer controller and a transmit queue included in the network switching device according to the first embodiment of the present invention.

FIG. 5 shows the relation of the group of registers located in the buffer controller 190 and the transmit queue.

As described above, for each of the transmit buffers 141 to 144, one transmit queue is created under the control of the buffer controller 190. Then, the packets are registered in each transmit queue so that the packet of a higher priority class is reserved for earlier transmission. The packets of the same priority class are registered in their receiving sequence. As shown in FIG. 5, therefore, in the transmit queue, the packets Ph(1) to Ph(s) of the high priority class are linked with one another, the packets PM(1) to Pm(t) of the middle priority class are linked with one another, and then the packets Pl(1) to Pl(u) of the low priority class are linked with one another (wherein "s," "t" or "u" is an integer of 1 or more).

The creation of the foregoing structured transmit queue makes the buffer capacity assigned to each priority class not restricted. This thus allows the received packets to be stored in the empty area of the buffer independently of the priority classes of those packets. When congestion takes place in a specific transmit port, therefore, no empty area is left in the corresponding transmit buffer, which leads to enhancing the using efficiency of the memory.

In the meantime, for managing the foregoing structured transmit queue, the buffer controller 190 is equipped with a group of registers for recognizing the write locations of the head one and the tail one of the packets of each priority class. If the packets of three priority classes may be treated as shown in FIG. 5, for the high priority class are provided a high priority head pointer register 191*a* and a high priority tail pointer register 192*a*, the latter of which points the head one of the packets of the high priority class and the latter of which points the tail one of the packets thereof. Likewise, for the middle priority class are provided a middle priority head pointer register 191*b* and a middle priority tail pointer register 192*b*. For the low priority class are provided a low priority head pointer register 191*c* and a low priority tail pointer register 192*c*. The tail pointer register of each priority class is updated when a new packet of the concerned priority class is registered. The head pointer register of each priority class is updated when the head packet of the concerned priority class is read out of the transmit buffer or when the corresponding priority class is empty and a new packet is added to it.

In the transmit queue, the packets of the same priority class are linked bidirectionally by means of pointers written in the attached cell area 140*b*. However, no such link is executed among the packets of respective priority classes. Hence, no preceding pointer is written in the attached cell area 140*b* of the head one of the packets of the same priority class. In place, the information that indicates no proceeding packet is written in the attached cell area 140*b* thereof. Further, no following pointer is written in the attached cell area 140*b* of the tail packet. In place, the information that indicates no following packet is written therein. In addition, the link of the packets of respective priority classes is managed by the pointers stored in the group of registers.

In turn, the operating process of the buffer controller 190 through the use of the pointers stored in the group of registers and the attached cell areas 140*b* of the packets will be described with reference to the flowchart. In the following description of the flowchart shown in FIGS. 6 and 7, it is assumed that the packets to be transferred from the network 21 to the network 22 are received. Further, the description about the process of the other components of the network switching device 100 will be added to the descriptions to be expanded with reference to FIGS. 6 and 7.

Figure 6:
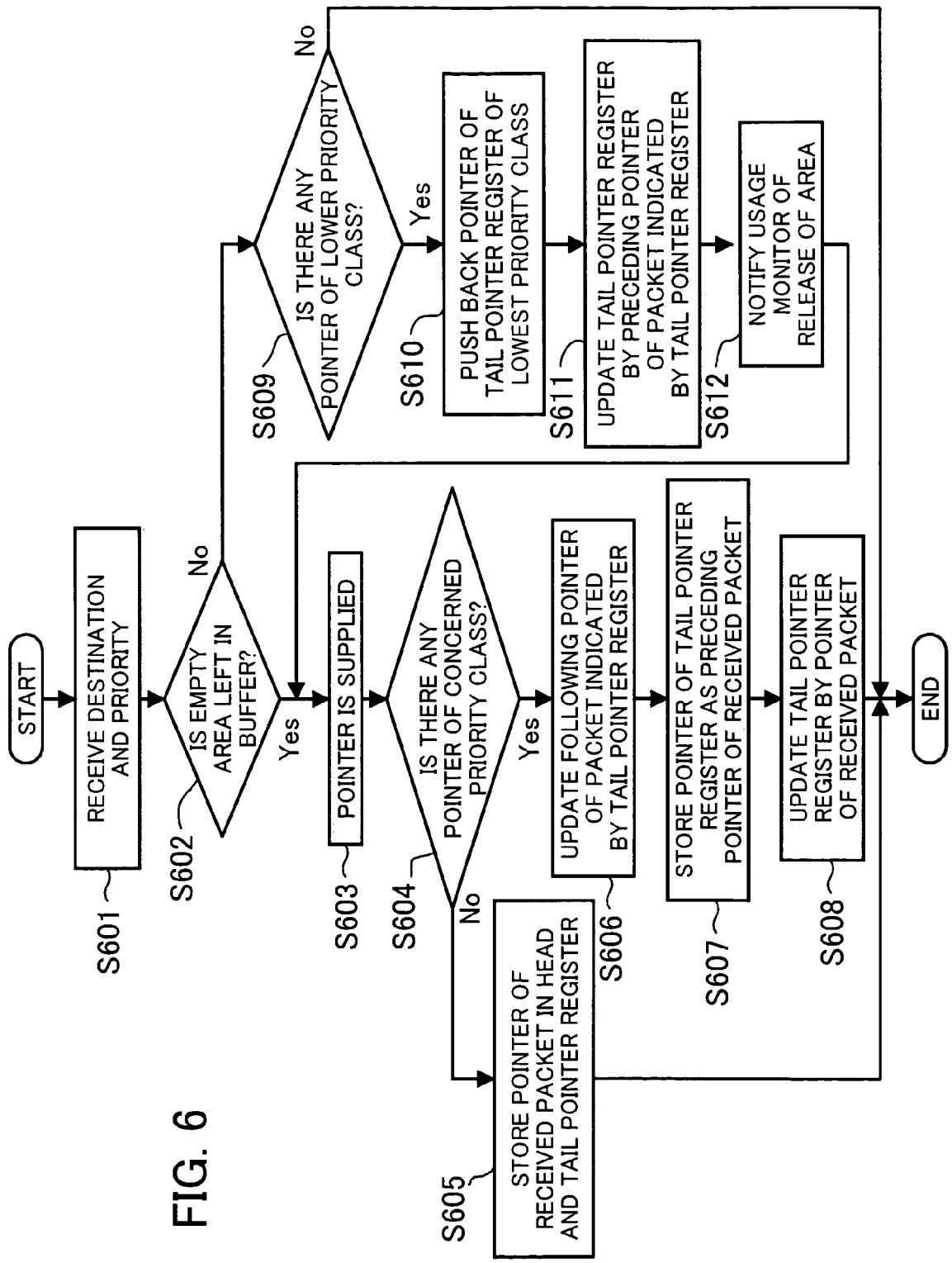
FIG. 6 is a flowchart showing a flow of process in the buffer controller in the case of writing packets in the transmit buffer in the network switching device according to the first embodiment of the present invention.

FIG. 6 is a flowchart showing a flow of process of the buffer controller 190 to be executed when writing the packet in the transmit buffer. Hereafter, the processes shown in FIG. 6 will be described along the step numbers.

The packet received in the receive interface 111 is temporarily stored in the receive buffer 121. Then, the stored packet is transferred to the data transfer circuit 150. At a time, the header information of this packet is notified to the header analyzer 160. The header analyzer 160 determines the priority class of that packet based on the destination of that packet and then notifies the buffer controller 190 of the determined priority class and the destination. The destination is also notified to the data transfer circuit 150.

[Step S601] The buffer controller 190 receives the destination and the priority class of the newly received packet from the header analyzer 160.

[Step S602] By referring to the information sent from the usage monitor 180, it is determined if an empty area is left in the corresponding transmit buffer 142 with the destination. If yes, the process goes to step S603, while if no, the process goes to step S609.

Herein, when the data transfer circuit 150 receives the packet from the receive buffer 121, the data transfer circuit 150 determines the destination of the received packet based on the notice sent from the header analyzer 160. As in the buffer controller 190, by referring to the information sent from the usage monitor 180, it is determined if an empty area is left in the corresponding transmit buffer 142 and then determines if the packet is to be transferred based on the former determination.

[Step S603] If an empty area is left in the transmit buffer 142, the pointer popped up from the pointer stack 170 is supplied to the data transfer circuit 150 and the buffer controller 190. The data transfer circuit 150 transfers the packet to the transmit buffer 142, in which the packet is written in the address pointed by the obtained pointer.

[Step S604] By referring to the head pointer register of the priority class to which the received packet belongs selectively from the corresponding head pointer registers of respective priority classes with the transmit buffer 142, it is determined if this register stores the pointer. If no, it is determined that no packet of the same priority class is registered in the transmit queue, and the process goes to step S605. If yes, it is determined that the packet of the same priority class has been already registered in the transmit queue, and the process goes to step S606.

[Step S605] The pointer obtained from the pointer stack 170, that is, the pointer that points the storage location of the received packet is stored in the corresponding head pointer register and tail pointer register with the priority class of the received packet. For example, if the received packet belongs to the middle priority class, the obtained pointer is stored in the middle priority head pointer register 191*b* and the middle priority tail pointer register 192*b*. At a time, the information that indicates no following packet is written in the attached cell area 140*b* of the received packet. This allows the received packet to be registered in the transmit queue. This is the end of the packet writing process.

[Step S606] If the packet of the same priority class as that of the received packet has been already registered in the transmit queue, at first, the buffer controller 190 refers to the tail pointer register of the concerned priority class. For example, when the received packet belongs to the middle priority class, the buffer controller 190 refers to the middle priority tail pointer register 192*b*. For the attached cell area 140*b* of the packet pointed by the pointer stored in this register 192*b*, the following pointer is updated by the pointer for pointing the received packet.

[Step S607] Then, the pointer stored in the tail pointer register is stored as the preceding pointer in the attached cell area 140*b* of the received packet. At a time, the information that indicates no following pointer is also written in the attached cell area 140*b*.

[Step S608] Further, the tail pointer register is updated by the pointer for pointing the received packet. This allows the received packet to be registered at the next location to the last registered packet of the packets of the same priority class in the transmit queue. This is the end of the packet writing process.

[Step S609] On the other hand, if no empty capacity is left in the corresponding transmit buffer 142 with the destination, at first, by referring to the head pointer registers belonging to the lower class than the priority class of the received packet, it is determined if the pointer is stored in any one of the registers. If stored, it means that the packet of the lower priority class has been already registered in the transmit queue. Then, the process goes to step S610.

If not stored, the packet writing process is terminated without any process. In this case, it is determined that the received packet belongs to the lowest priority class of the packets registered in the transmit queue or the lower priority class than the lowest class of the packets registered therein and the packet is to be discarded. The usage monitor 180 continues to notify the data transfer circuit 150 of no empty area left in the transmit buffer 142. In response, the data transfer circuit 150 does not transfer the received packet and discard it.

[Step S610] If a packet of a lower class than that of the received packet exists in the transmit queue, at first, the buffer controller 190 returns the pointers stored in the tail pointer register of the lowest priority class back to the pointer stack 170. For example, if the transmit queue shown in FIG. 5 is created, the pointers stored in the low priority tail pointer register 192*c* is released. This causes the area of the transmit buffer 142 to be released by one packet.

[Step S611] The process is executed to extract the proceeding pointer from the attached cell area 140*b* of the packet pointed by the returned pointer and then update the tail pointer register by this proceeding pointer. At a time, the following pointer is erased from the attached cell area 140*b* of the packet pointed by the extracted proceeding pointer and the information that indicates no following packet is written in the attached cell area 140*b*. This causes the tail packet of the transmit queue to be erased from the registration. In addition, if the information that indicates no proceeding packet is written in the attached cell area, the pointers of both the tail pointer register and the head pointer register of the corresponding priority class are erased.

[Step S612] The release of the area of the transmit buffer 142 is notified to the usage monitor 180, and then the process goes to the step S603. The notice causes the usage monitor 180 to determine that an empty area occurs in the transmit buffer 142 and notify the data transfer circuit 150 of the occurrence. In response to this notice, the data transfer circuit 150 obtains the pointer from the pointer stack 170 through the process of the step S603, transfers the packet to the transmit buffer 142, and then writes the packet at the address pointed by the obtained pointer.

The foregoing process allows the received packet to be reserved for transmission next to the last registered packet of the packets of the same priority class registered in the transmit queue, (which process corresponds with the steps S606 to S608). If no packet of the same priority class as that of the received packet is registered in the transmit queue, the received packet is registered at the location of this priority class in the transmit queue, (which process corresponds with the step S605). Concretely, if the packet of the lower priority class than that of the received packet has been already registered in the transmit queue, the received packet is registered next to the last registered packet of the packets of the closest upper priority class to that of the received packet. For example, when the received packet of the middle priority class is registered in the transmit queue in which only the packets of the high and the low priority classes are registered, the received packet is inserted next to the last packet of the high priority class that is upper than that of the received packet. Further, if no packet of the upper priority class than that of the received packet is registered, the received packet is registered at the head of the transmit queue.

Further, since the capacity of each transmit buffer 141 to 144 is finite, if the concentration of the packets onto the network 22 causes the transmit buffer 142 to be full, the packet is required to be discarded from the transmit buffer 142. The packet to be discarded is the last registered packet of the lowest priority class selected from all the packets registered in the transmit queue, (which process corresponds with the steps S610 to S612). Further, if no packet of the lower priority class than the priority class to which the received packet belongs is registered in the transmit queue, the received packet itself is discarded.

In the transmit queue, therefore, the packets are registered so that the packets of a higher priority class are transmitted earlier. Further, since the buffer capacity to be assigned for each priority class is not restricted, if an empty area is left in the transmit buffer, the received packet is stored in the empty area independently of its priority class. Conversely, if an empty area is left in the transmit buffer, the packet of the lowest priority class is constantly discarded and the packets of the high priority class are reliably reserved for transmission.

Hence, if congestion takes place in the specific transmit queue, the packets of a higher priority class are transmitted more reliably and no empty area takes place in the transmit buffer. This results in enhancing the using efficiency of the transmit buffers 141 to 144 and reducing the capacity of each buffer, thereby lowering the cost of each component.

The link among the packets registered in the transmit queue is managed as the bidirectional linked list structure through the use of the pointers for pointing the write locations of the packets. This management makes it possible to efficiently execute the process of registering the packets in the transmit queue as well as the process of discarding the temporarily registered packets of the low priority class.

Figure 7:
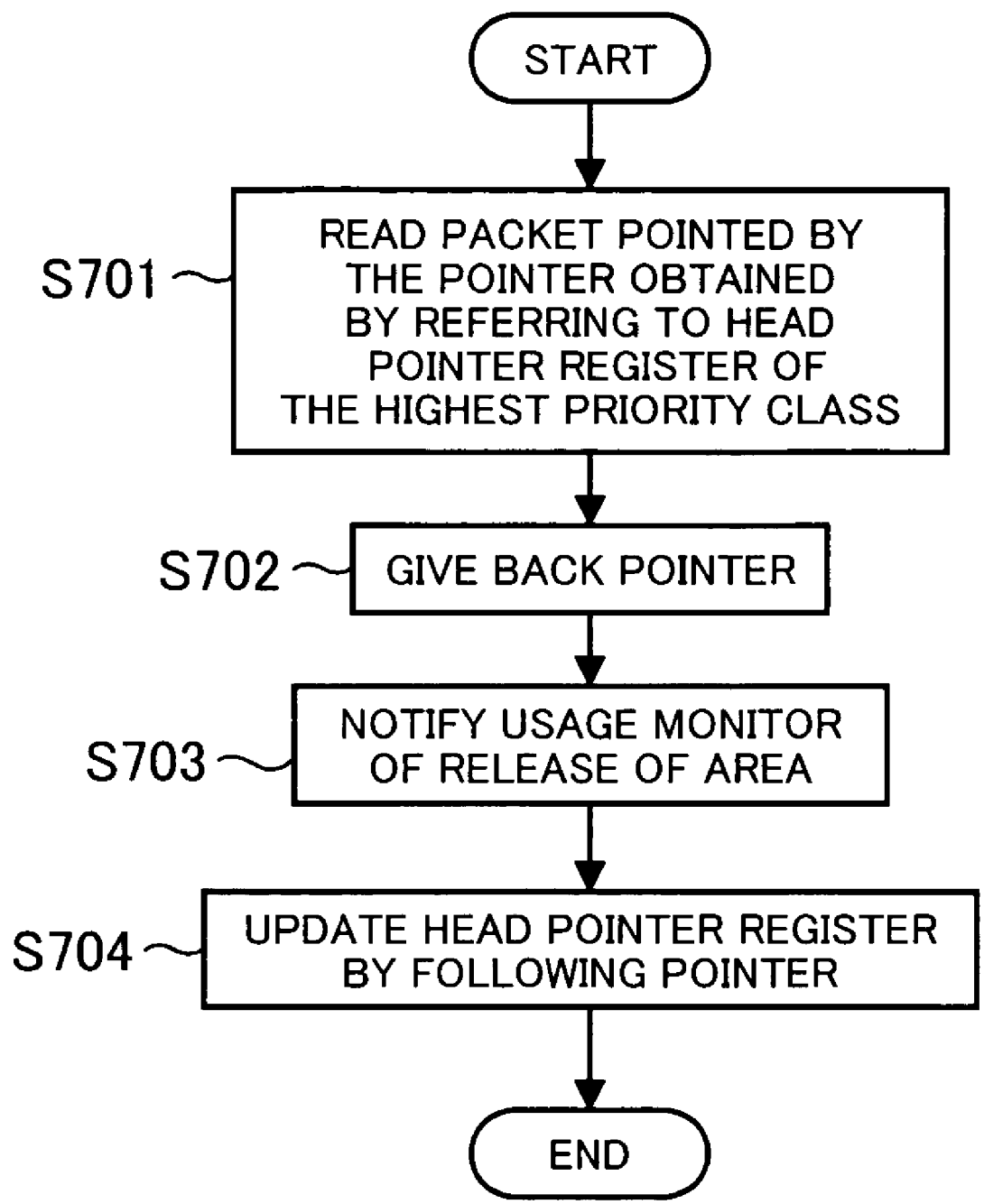
FIG. 7 is a flowchart showing a flow of process in the buffer controller in the case of reading packets out of the transmit buffer in the network switching device according to the first embodiment of the present invention.

In turn, FIG. 7 is a flowchart showing the flow of process to be executed by the buffer controller 190 in the case of reading the packet out of the transmit buffer. Hereafter, the process shown in FIG. 7 will be described along the step numbers.

[Step S701] The buffer controller 190 refers to the register of the highest priority class of the head pointer register for storing the pointer. Then, the buffer controller 190 reads out the packet pointed by the pointer stored in this register and then transfers the packet to the corresponding transmit interface 132. This causes the read packet to be sent out to the network 22.

[Step S702] The pointer of the head pointer register referred in the step S701 is pushed back to the pointer stack 170.

[Step S703] The release of the area of the transmit buffer 142 is notified to the usage monitor 180.

[Step S704] The head pointer register of the corresponding priority class is updated by the following pointer of the attached cell area 140b of the packet pointed by the returned pointer. Herein, if the information that indicates no following packet is written in the attached cell area 140b referred thereby, this information is written in the head pointer register of the corresponding priority class. This causes the packets of the lower priority class to be read out in the next reading operation.

The foregoing process allows the packets to be read out of the transmit queue in sequence hence resulting in the packets being sent sequentially to their respective destinations connected to the network. The use of the pointers held in the group of registers provided in the buffer controller 190 and the pointers stored in the attached cell area 140b makes it possible to more efficiently read the packets in the transmission-reserving sequence of the transmit queue. Further, by pushing back the pointer for pointing the read packet to the pointer stack 170, the empty area that may store the next received packet takes place, so that the transmit buffer may be efficiently used.

Second Embodiment

In turn, the description will be oriented to the second embodiment of the present invention. In the second embodiment, the overall arrangement of the network switching device is the same as the arrangement shown in FIG. 3 except the following respects. First, the data to be stored in the transmit buffers 141 to 144 is only the content of the packets. No attached data area is formed. Second, in the buffer controller 190, the pointer memory for managing pointers of all the packets registered in each transmit queue is secured for each priority class, and the registration, the discard and the read of the packets are executed with respect to the transmit queue through the use of these pointer memories.

Figure 8:
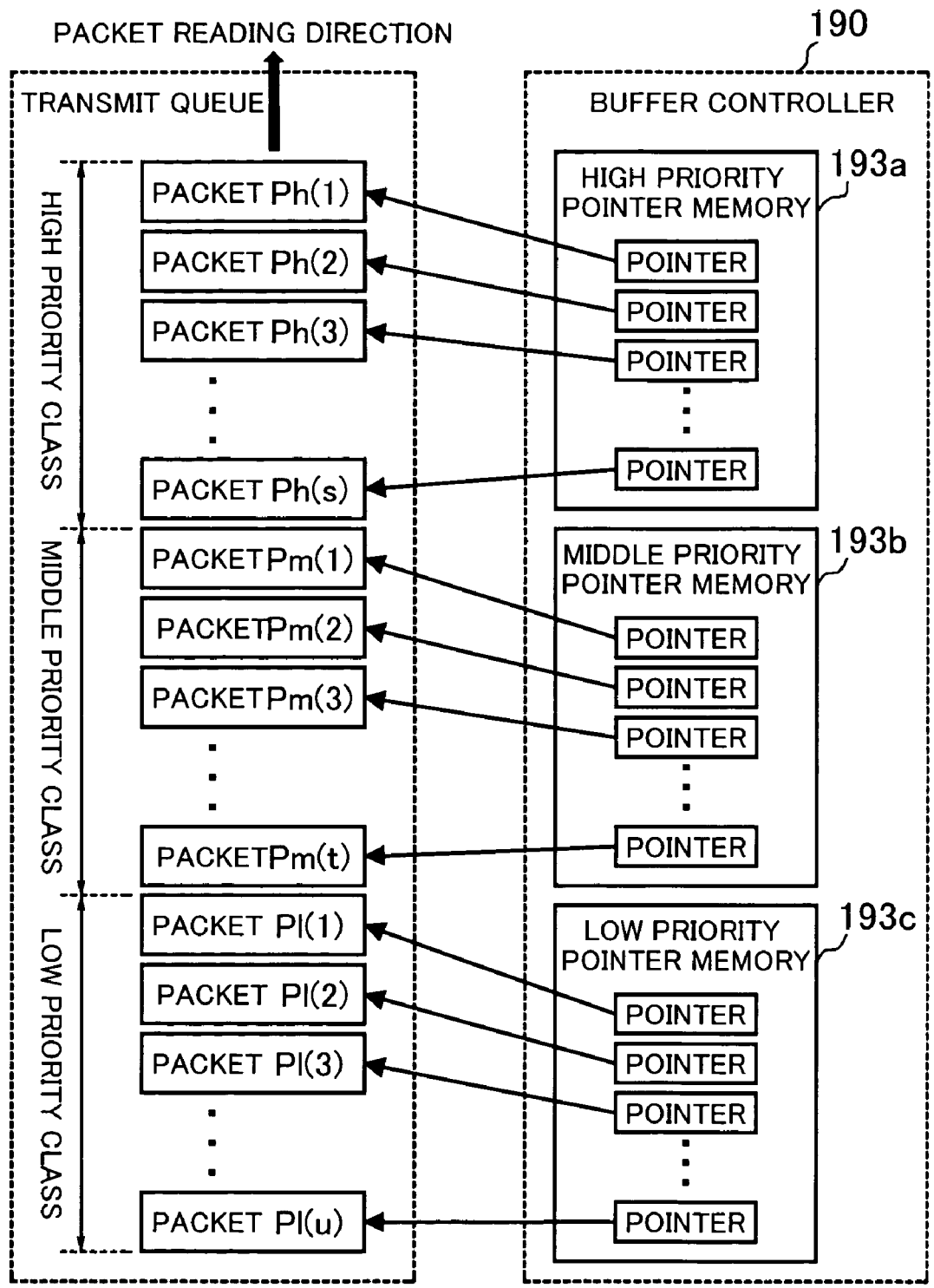
FIG. 8 illustrates relation between pointer memories provided in the buffer controller and the transmit queue in the network switching device according to a second embodiment of the present invention.

FIG. 8 illustrates the relation between the pointer memories secured in the buffer controller 190 and the transmit queue.

Also in this embodiment, like the first embodiment, one transmit queue is created for each of the transmit buffers 141 to 144. In each transmit queue, the packets are registered so that the packets of a higher priority class may be reserved for earlier transmission. The packets of the same priority class are registered in the receiving sequence. In the transmit queue, therefore, the packets Ph(1) to Ph(s) of the high priority class are linked, the packets Pm(1) to Pm(t) of the middle priority class are linked, and the packets Pl(1) to Pl(u) of the low priority class are linked (wherein "s," "t" or "u" is an integer of 1 or more).

In this embodiment, for managing the foregoing structured transmit queue, the buffer controller 190 provides pointer memories each for a priority class, each of which pointer memory holds the pointers for pointing all the packets registered in the transmit queue. In a case that three priority classes may be treated as shown in FIG. 8, a high priority pointer memory 193a, a middle priority pointer memory 193b, and a low priority pointer memory 193c are provided for the high priority, the middle priority and the low priority classes, respectively.

Each pointer memory stores the pointers obtained from the pointer stack 170 by the buffer controller 190. Each pointer memory enables to hold the pointers in the obtaining sequence, that is, in a FIFO (First In First Out) type of manner.

Hereafter, the process of the buffer controller through the use of the pointers stored in these pointer memories will be described with reference to the flowchart. In the description of the flowcharts shown in FIGS. 9 and 10, it is assumed that the received packets are to be transferred from the network 21 to the network 22. Also in the description about FIGS. 9 and 10, if necessary, the description about the process of another component included in the network switching device 100 will be added.

Figure 9:
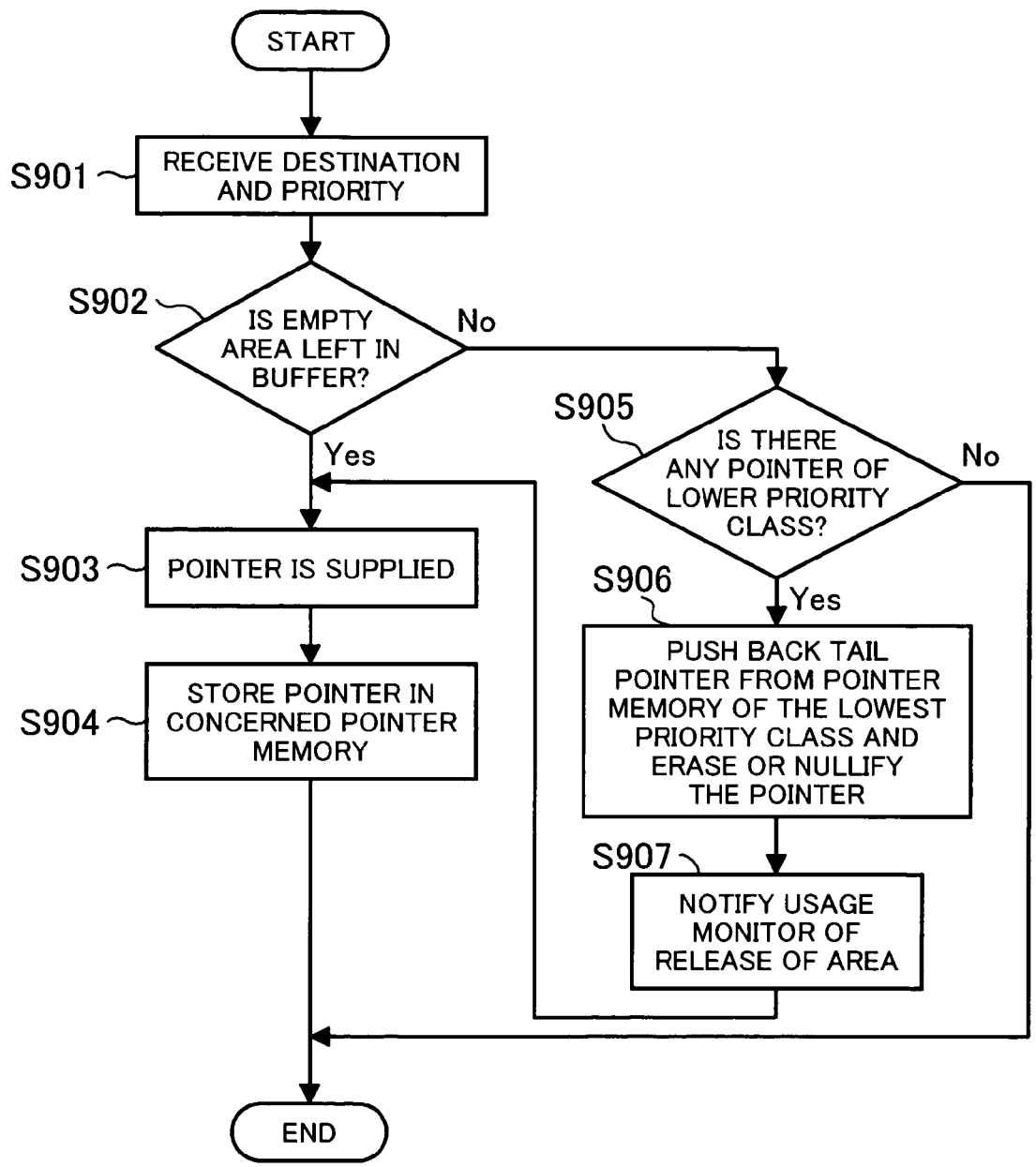
FIG. 9 is a flowchart showing a flow of process in the buffer controller in the case of writing packets in the transmit buffer in the network switching device according to the second embodiment of the present invention.

FIG. 9 is a flowchart showing a flow of process to be executed by the buffer controller 190 in a case that the packets are written in the transmit buffer.

Like the first embodiment, the packet received in the receive interface 111 is temporarily stored in the receive buffer 121. Then, the stored packet is passed to the data transfer circuit 150 and the header information of the packet is notified to the header analyzer 160. The header analyzer 160 determines the priority class of the packet based on information obtained from the packet and notifies the buffer controller 190 of the priority class of the packet and the destination. Further, the destination is notified to the data transfer circuit 150.

[Step S901] The buffer controller 190 is notified of the destination of the newly received packet and its priority class by the header analyzer 160.

[Step S902] By referring to the information from the usage monitor 180, the buffer controller 190 determines if an empty area is left in the corresponding transmit buffer 142 with the destination. If yes, the process goes to step S903, while if no, the process goes to step S905.

After receiving the packet from the receive buffer 121, the data transfer circuit 150 determines the destination of this packet based on the notice given from the header analyzer 160. Likewise, by referring to the information sent from the usage monitor 180, the data transfer circuit 150 determines if an empty area is left in the corresponding transmit buffer 142 and determines if the packet is to be transferred based on the former determination.

[Step S903] If an empty area is left in the transmit buffer 142, a pointer is popped up from the pointer stack 170 and is supplied to the data transfer circuit 150 and the buffer controller 190. The data transfer circuit 150 operates to transfer the packet to the transmit buffer 142 so to write the packet at the address pointed by the obtained pointer.

[Step S904] The buffer controller 190 stores the pointer obtained in the step S903 at the tail of the corresponding pointer memory with the priority class of the received packet, selected from the pointer memories for the priority classes of the corresponding transmit buffer 142. This causes the received packet to be registered in the transmit queue.

[Step S905] If no empty capacity is left in the corresponding transmit buffer 142 with the destination, by referring to the corresponding pointer memory with the lower class than the priority class of the received packet, it is determined if the pointer is stored in any of the pointer memories. If stored, it is determined that the packet of a lower priority class has been already registered in the transmit queue. Then, the process goes to step S906.

On the other hand, if not stored, the process of writing the packet is terminated without doing any process. In this case, it has been determined that the received packet belongs to a priority class lower than or equal to the lowest priority class that contains packets registered in the queue, and the packet is discarded. The usage monitor 180 continues to notify the data transfer circuit 150 of no empty area left in the transmit buffer 142. Based on this notice, the data transfer circuit 150 discards the packet received from the receive buffer 122.

[Step S906] If the packet of a lower class than the class of the received packet has been already registered in the transmit queue, by referring to the pointer memory for the lowest priority class of the pointer memories where the pointers are registered, the buffer controller 190 returns the tail pointer in the referred pointer memory to the pointer stack 170 and then erases or nullifies the pointer from the pointer memory. This causes the area of the transmit buffer 142 to be released by one packet.

[Step S907] The buffer controller 190 notifies the usage monitor 180 of the release of the area of the transmit buffer 142. Then, the process goes to the step S903. By this, the usage monitor 180 determines the occurrence of an empty area in the transmit buffer 142 and then notifies the data transfer circuit 150 of the occurrence. In response to this notice, the data transfer circuit 150 obtains a pointer from the pointer stack 170 through the process of the step S903, transfers the packet to the transmit buffer 142, and write the packet at the address pointed by the obtained pointer.

The foregoing process allows the same transmit queue as that of the first embodiment to be created. That is, through the processes of the steps S903 and S904, the received packet is reserved for transmission next to the last registered one of the packets of the same priority class registered in the transmit queue. Further, if no packet of the same priority class as that of the received packet is registered in the transmit queue, the received packet is registered at the corresponding location with this priority class in the transmit queue.

Further, for example, if the transmit buffer 142 is buried by the packets destined for the network 22, through the processes of the steps S906 to S907, the last registered packet of the lowest priority class is discarded from the transmit queue. If no packet of the lower class than the priority class to which the received packet belongs is registered, the received packet itself is discarded.

Figure 10:
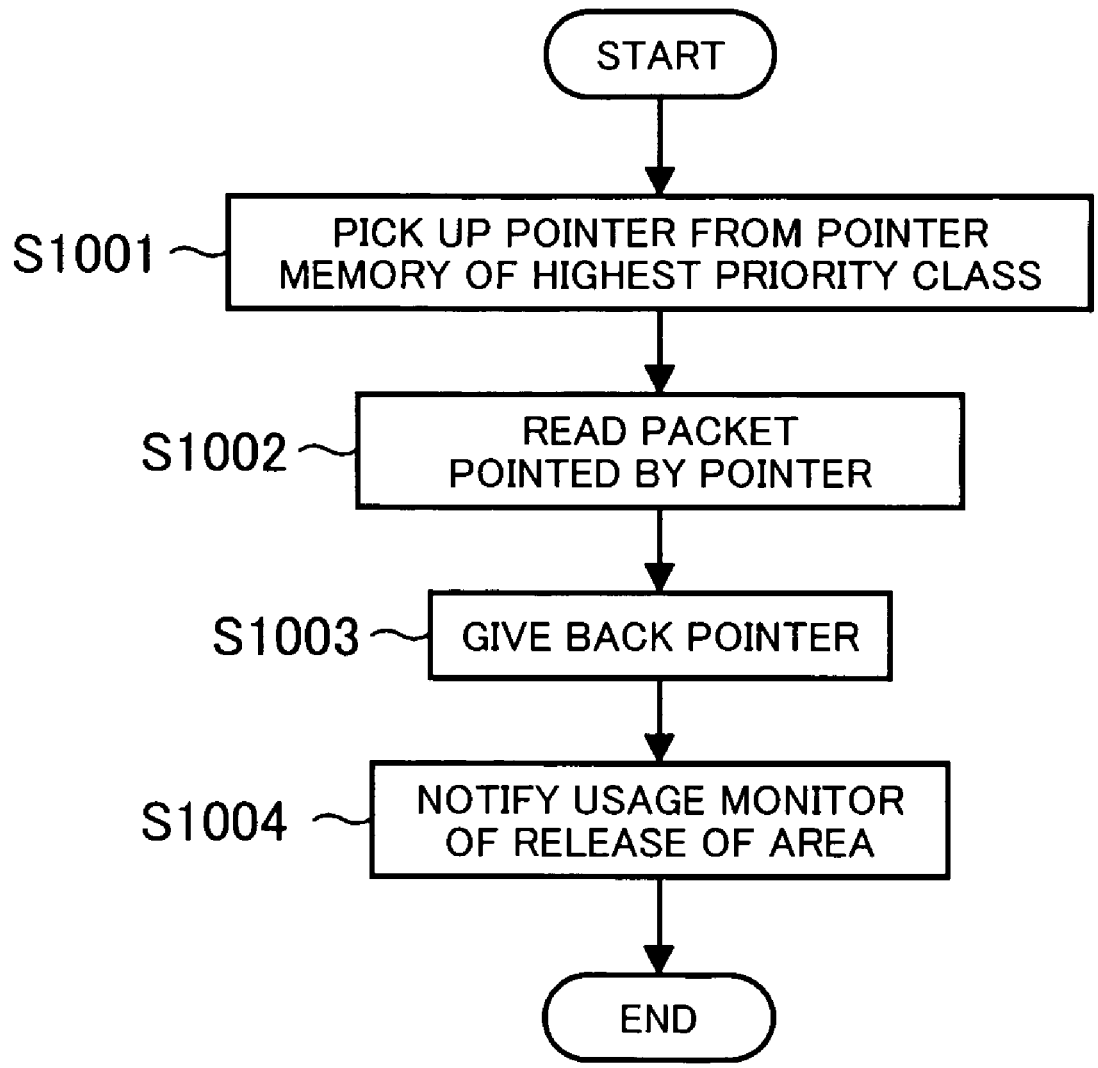
FIG. 10 is a flowchart showing a flow of process in the buffer controller in the case of reading packets out of the transmit buffer in the network switching device according to the second embodiment of the present invention.

FIG. 10 is a flowchart showing the flow of process to be executed by the buffer controller 190 when reading the packet from the transmit buffer. Hereafter, the process shown in FIG. 10 will be described along the step numbers.

[Step S1001] The buffer controller 190 picks up the pointer stored in the pointer memory for the highest priority class of the pointer memories where the pointers are stored. The picked-up pointer is erased or nullified from the pointer memory.

[Step S1002] The buffer controller 190 reads the packet pointed by the picked-up pointer and then transfers the packet to the transmit interface 132. This causes the read packet to be sent out to the network 22.

[Step S1003] The picked-up pointer is pushed back to the pointer stack 170.

[Step S1004] The release of the area of the transmit buffer 142 is notified to the usage monitor 180.

The foregoing process allows the packets to be sequentially read out of the transmit queue and then sent out to the network to which the destination terminal is connected. The use of the pointers held in the pointer memory located in the buffer controller 190 makes it possible to efficiently read out the packets in the sequence reserved for transmission in the transmit queue. Since the pointer for pointing the read packet is pushed back to the pointer stack 170, the empty area where the next received packet is to be stored is released so that the transmit buffer may be more efficiently used.

As described above, the arrangement of the second embodiment greatly simplifies the process of managing the pointers in comparison with that of the first embodiment. For the second embodiment, however, each pointer memory is required to have a function of storing the data in the FIFO manner and sequentially erasing or nullifying the data at the tail. It means that the pointer memory needs the complicated writing and reading control, which requires an expensive control circuit. The arrangement of the second embodiment thus needs costly components and a large installation area.

In the foregoing first and second embodiments, the areas of the transmit buffers 141 to 144 respectively for the transmit ports are secured in the shared memory, and the write location of the shared memory is managed one-dimensionally by one stack pointer. In place, however, the areas of the transmit buffers 141 to 144 may be physically separated. In this arrangement, the pointer stack 170 is provided for each of the transmit buffers 141 to 144 so that the write and read addresses may be managed through the pointer stack 170. Further, the usage monitor 180 may determine if an empty area is left in each of the transmit buffers 141 to 144 based on whether or not the unused pointer is left in each pointer stack.

Third Embodiment

In turn, the third embodiment of the present invention will be described below. The overall arrangement of the network switching device according to the third embodiment is the same as that shown in FIG. 3 except the respect that two or more transmit queues are created in each of the transmit buffers 141 to 144.

Figure 11:
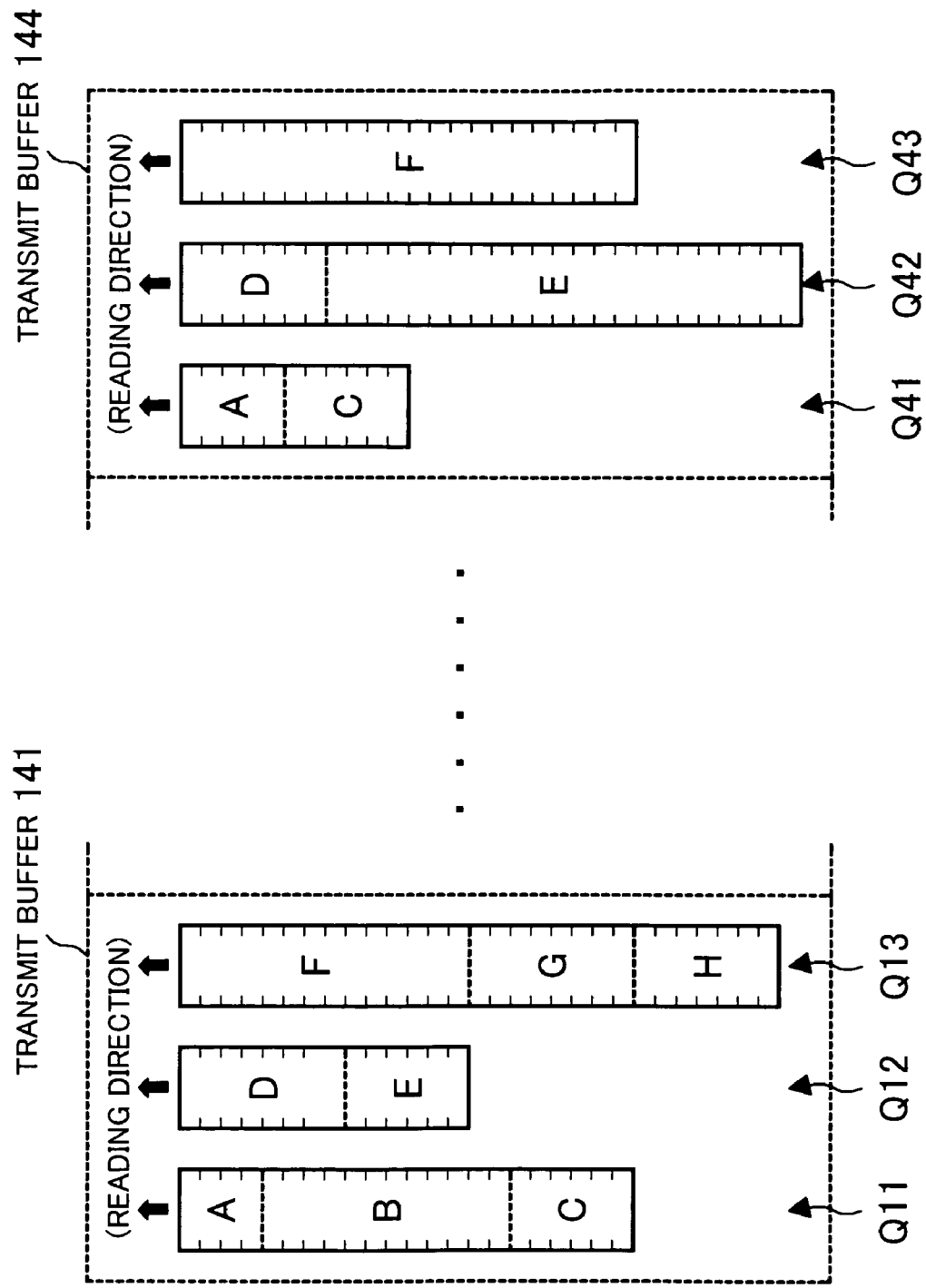
FIG. 11 illustrates an exemplary transmit queue formed in each transmit buffer included in the network switching device according to a third embodiment of the present invention.

FIG. 11 shows an exemplary transmit queue created for each transmit buffer. In the following description, the eight priority classes of A to H may be treated. The priority is higher in the sequence of A to H.

As shown in FIG. 11, three transmit queues are created for each of the transmit buffers 141 to 144. In each transmit queue are registered the packets of one or more adjacent priority classes. In FIG. 11, the packets of the priority classes "A," "B" and "C" may be registered in the first transmit queue, the packets of the priority classes "D" and "E" may be registered in the second transmit queue, and the packets of the priority classes "F," "G" and "H" may be registered in the third transmit queue.

In the transmit buffer 141 shown in FIG. 11, the packets of the priority classes "A," "B" and "C" are registered in the first transmit queue Q11, the packets of the priority classes "D" and "E" are registered in the second transmit queue Q12, and the packets of the priority classes "F," "G" and "H" are registered in the third transmit queue Q13. In the transmit buffer 144, the packets of the priority classes "A" and "C" are registered in the first transmit queue Q41, the packets of the priority classes "D" and "E" are registered in the second transmit queue Q42, and the packets of the priority class "F" are registered in the third transmit queue Q43.

For managing the foregoing registration of the packets in the transmit queues, the usage monitor 180 counts the buffer usage of each of the transmit buffers 141 to 144 for each transmit queue. Further, the management of the link among the packets in the transmit queue may be used in the first and the second embodiments. Then, the buffer controller 190 determines if the packets are registered in the transmit queue when reading the packet. The determination is proceeded in the sequence of the higher to lower priority classes assigned to the transmit queues. The packets are sequentially read out of the transmit queue in which those packets are determined to be registered.

The foregoing network switching device is arranged to limit the registerable number of packets at a unit of one or more priority classes to be registered in one transmit queue. Hence, when congestion takes place, even though an empty area is left in the transmit queue of the lower priority class, the packets of the higher priority classes may be discarded. In order to overcome this shortcoming, it is preferable to assign a larger buffer capacity to the transmit queue for the packets of a higher priority class.

As set forth above, in the network switching device according to the present invention, one transmit queue is created for the corresponding buffer with the destination network and the packets are registered in each transmit queue so that the packets having been received earlier and higher priority classes are transmitted earlier. At a time, since the buffer capacity to be assigned for each priority class is not restricted, the received packets may be stored in the empty area of the buffer independently of the priority classes of the packets. Hence, if congestion takes place in a specific transmit queue, the packets of higher priority classes are transmitted more reliably. Further, this network switching device is effective in enhancing the using efficiency of the buffer and suppressing the capacity of the buffer, thereby lowering the cost of the components.

Further, the link among the packets registered in each transmit queue may be managed in the linked list structure based on the write location of each packet in each buffer through the effect of the buffer controller. This results in enhancing the efficiency of the address management in registering the packets in each transmit queue and outputting the packets from the transmit queue.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A network switching device for transferring packets among a plurality of networks, comprising:

a plurality of buffers located for each of the networks to which the packets are to be transferred;

a priority determining circuit for determining a priority class of each of the packets received by the device; and a buffer controller for creating in each of the buffers a transmit queue in which the packets of plural priority classes are to be registered, writing each of the received packets in the corresponding buffer with the information of the received packet, and registering the received packet so that the received packet may be reserved for transmission next to the last registered one of the packets of the same priority class registered in the corresponding transmit queue based on the determined result of the priority determining circuit; and a usage monitor for determining if the usage of each of the transmit queues reaches a predetermined threshold value, wherein if the usage of the corresponding transmit queue is determined to reach the threshold value by the usage monitor, when registering the received packet in the transmit queue, the buffer controller discards the last registered packet of the lowest priority class of the packets registered in the transmit queue, wherein the buffer controller manages the link among the packets registered in each of the transmit queues in the linked list structure formed on the write location of each of the packets in each of the buffers, further comprising:

a pointer stack for holding pointers, each of which points a write location of each of the packets in each of the buffers, wherein the buffer controller pops up the pointer from the corresponding pointer stack for obtaining the pointer when writing the packet to the buffer and manages the link among the packets in the transmit queue created in each of the buffers with the obtained pointer, and wherein the buffer controller writes the pointers for pointing the write locations of the just preceding packet and the just following packet in each of the transmit queue as accessory data in the buffer together with the received packet, wherein the buffer controller is equipped with a tail pointer holder for holding the pointer for pointing the last registered one of the packets of the same priority class in each of the transmit queues, the tail pointer holder being located for each of the priority classes, and when registering a new one of the received packet, the buffer controller rewrites the pointer for pointing the following packet of the accessory data of the packet pointed by the pointer held in the tail pointer holder for the priority class of the received packet into the pointer for pointing the received packet, writes the pointer held in the tail pointer holder for the priority class of the received packet as the pointer for pointing the just preceding packet in the accessory data of the received packet, and rewrites the pointer held in the tail pointer holder for the priority class of the received packet into the pointer for pointing the received packet.

2. The network switching device according to claim 1, wherein if the usage of the corresponding buffer is determined to exceed the threshold value, when registering the received packet in the transmit queue, the buffer controller discards the received packet itself if the received packet belongs to a priority class that is lower than or equal to the lowest priority class registered in the destination transmit queue.

3. The network switching device according to claim 1, wherein when registering the received packet in the transmit queue, if no packet of the same priority class as that of the received packet is registered in the transmit queue and the packet of the higher priority class than that of the received packet has been already registered in the transmit queue, the buffer controller registers the received packet next to the last registered packet, while if no packet of the higher priority class than that of the received packet is registered in the transmit queue, the buffer controller registers the received packet at the head of the transmit queue.

4. The network switching device according to claim 1, wherein the buffer controller is equipped with a head pointer holder for holding the pointer for pointing the first registered one of the packets of the same priority class in each of the transmit queues, the head pointer holder being located for each priority class, and when reading the packet from each of the buffers, by referring to the header pointer holder for the highest priority class of the packets with which the pointers held in the holder are concerned, the buffer controller reads the packet pointed by the head pointer and updates the header pointer holder having been referenced through the use of the pointer for pointing the following one of the pointers written in the accessory data of the read packet.

5. The network switching device according to claim 1, wherein upon completion of transmitting the packet from the transmit queue, the buffer controller pushes the pointer assigned to the transmitted packet back to the pointer stack.

6. A network switching device for transferring packets among a plurality of networks, comprising:

a plurality of buffers located for each of the networks to which the packets are to be transferred;

a priority determining circuit for determining a priority class and a destination of the received packet when the received packet is inputted therein;

a buffer controller for creating a plurality of transmit queues to which the packets of one or more priority classes adjacent to each other are to be registered in each of the buffers, writing the received packet to the corresponding buffer with information of the received packet, and registering the received packet so that the packet may be reserved for transmission next to the last registered packet of the packets of the same priority class registered in the corresponding transmit queue based on the determined result of the priority determining circuit; and a usage monitor for determining if the usage of each of the transmit queues reaches a predetermined threshold value, wherein if the usage of the corresponding transmit queue is determined to reach the threshold value by the usage monitor, when registering the received packet in the transmit queue, the buffer controller discards the last registered packet of the lowest priority class of the packets registered in the transmit queue, wherein the buffer controller manages the link among the packets registered in each of the transmit queues in the linked list structure formed on the write location of each of the packets in each of the buffers, further comprising:

a pointer stack for holding pointers, each of which points a write location of each of the packets in each of the buffers, wherein the buffer controller pops up the pointer from the corresponding pointer stack for obtaining the pointer when writing the packet to the buffer and manages the link among the packets in the transmit queue created in each of the buffers with the obtained pointer, and wherein the buffer controller writes the pointers for pointing the write locations of the just preceding packet and the just following packet in each of the transmit queue as accessory data in the buffer together with the received packet, wherein the buffer controller is equipped with a tail pointer holder for holding the pointer for pointing the last registered one of the packets of the same priority class in each of the transmit queues, the tail pointer holder being located for each of the priority classes, and when registering a new one of the received packet, the buffer controller rewrites the pointer for pointing the following packet of the accessory data of the packet pointed by the pointer held in the tail pointer holder for the priority class of the received packet into the pointer for pointing the received packet, writes the pointer held in the tail pointer holder for the priority class of the received packet as the pointer for pointing the just preceding packet in the accessory data of the received packet, and rewrites the pointer held in the tail pointer holder for the priority class of the received packet into the pointer for pointing the received packet.

7. A network switching method for transferring received packets among a plurality of networks as temporarily storing the received packets in the corresponding buffer with the network to which each of the packets are to be transferred, comprising the steps of:

determining a priority class and a destination of the received packet being inputted into a module for determining a priority class and a destination; and creating a transmit queue in which the packets of two or more priority classes are to be registered in each of the buffers, writing the received packet in the corresponding buffer with information of the received packet, and registering the received packet so that the received packet may be reserved for transmission next to the last registered packet of the packets of the same priority class registered in the corresponding transmit queue, wherein if the usage of the corresponding buffer reaches a predetermined threshold value, when registering the received packet in the transmit queue, the last registered packet of the lowest priority class of the packets registered in the transmit queue is discarded, wherein the buffer controller manages the link among the packets registered in each of the transmit queues in the linked list structure formed on the write location of each of the packets in each of the buffers, further comprising:

holding pointers in a pointer stack, each of which points a write location of each of the packets in each of the buffers, wherein the buffer controller pops up the pointer from the corresponding pointer stack for obtaining the pointer when writing the packet to the buffer and manages the link among the packets in the transmit queue created in each of the buffers with the obtained pointer, and wherein the buffer controller writes the pointers for pointing the write locations of the just preceding packet and the just following packet in each of the transmit queue as accessory data in the buffer together with the received packet, wherein the buffer controller is equipped with a tail pointer holder for holding the pointer for pointing the last registered one of the packets of the same priority class in each of the transmit queues, the tail pointer holder being located for each of the priority classes, and when registering a new one of the received packet, the buffer controller rewrites the pointer for pointing the following packet of the accessory data of the packet pointed by the pointer held in the tail pointer holder for the priority class of the received packet into the pointer for pointing the received packet, writes the pointer held in the tail pointer holder for the priority class of the received packet as the pointer for pointing the just preceding packet in the accessory data of the received packet, and rewrites the pointer held in the tail pointer holder for the priority class of the received packet into the pointer for pointing the received packet.

\* \* \* \* \*

UNITED STATES PATENT AND TRADEMARK OFFICE
CERTIFICATE OF CORRECTION

PATENT NO.        : 7,620,054 B2
APPLICATION NO.   : 11/047774
DATED             : November 17, 2009
INVENTOR(S)       : Taul Katayama It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1015 days.

Signed and Sealed this

Twenty-sixth Day of October, 2010

David J. Kappos
*Director of the United States Patent and Trademark Office*